April 25, 1944.  L. F. HAMMAND  2,347,193
SIGNALING DEVICE
Filed Nov. 18, 1941
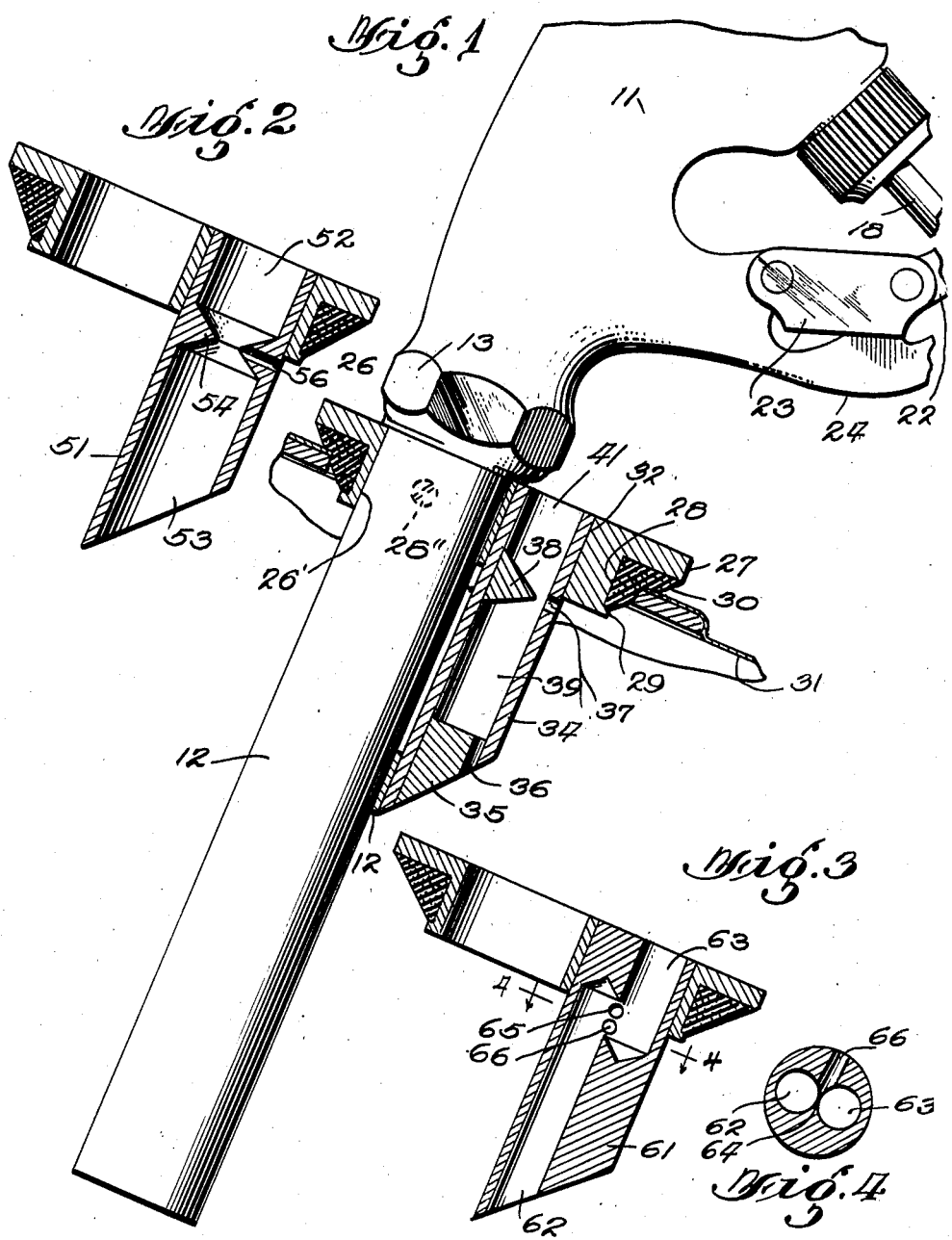
INVENTOR.
L. F. Hammand
BY
ATTORNEY Patented Apr. 25, 1944

2,347,193

UNITED STATES PATENT OFFICE 2,347,193

SIGNALING DEVICE

Lowell F. Hammand, Washington, D. C.

Application November 18, 1941, Serial No. 419,523

6 Claims. (Cl. 116—109)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to gasoline dispensing equipment and more particularly to a novel and improved form of signaling device arranged to emit an audible signal as the level of the liquid in the container being filled approaches the top of the container.

One of the principal objects of this invention is to provide a signaling nozzle including a whistle structure so arranged and constructed that the whistle remains inaudible throughout the period of time in which the container is being filled and emits a signal only when the level of liquid in the container reaches a predetermined level.

A further object of the invention is to provide an improved audible signal indicator of such design and construction as to be operative within wide limits of rate of flow and pressure, in order to be equally well adapted for use with fuel under pressure or gravity feed.

A further object of the invention is the provision of an improved signal whistle structure of simple and rugged construction, having no moving parts and capable of withstanding great physical abuse.

A further object of the invention is the provision of a nozzle signaling device including a whistle having a tubular whistle chamber with inlet and discharge ports, arranged to provide means for rendering the whistle inoperative until the level of the liquid in the container being filled reaches a predetermined level.

Before describing the detailed structure illustrated in the drawing, it is believed pertinent to point out that the present structure has been developed primarily to meet present military requirements in which it has been found desirable to provide gasoline dispensing nozzles so arranged as to give an audible signal when the level of liquid in the container being filled reaches a predetermined level, so that the operator may manually close the fuel valve before the container being filled overflows.

It is also believed to be pertinent to point out that in modern military operations the use of large stationary or moveable gasoline tanks in combat operations is frowned on for the reason that any large container becomes an obvious target for enemy aircraft attack or artillery bombardment. It is the present preferred military practice to refuel tanks, aircraft or other combat vehicles from relatively small metal containers shipped into the battle zone by truckloads, and of such size and shape that they may be easily concealed in locations spaced apart from each other, so that they will not present such a vulnerable target to the enemy. These individual containers are filled from larger tanks or tank cars back of the zone of combat and after being emptied in the refueling operations in the field are returned behind lines for subsequent refilling.

In view of the tremendous quantities of gasoline utilized in modern military operations and the obvious dangers incident to the spilling of inflammable fuel near the storage tanks, it will be apparent that some means must be provided for filling such small containers so that large numbers of them may be quickly filled to the desired level without danger of overflowing. It should not be overlooked, however, that the rough treatment and abuse that military equipment of this character necessarily receives prevents the use of any structure except the most rugged and simple available. Also, since operations of the character described are preferably carried out in absolute darkness, ordinary visual types of indicating devices are entirely impractical.

Referring now more particularly to the drawing,

Fig. 1 is a central sectional view of a signal structure constructed in accordance with the teachings of the present disclosure, and is illustrated as applied to a conventional type of gasoline dispensing nozzle.

Fig. 2 is a modified form of the signaling device illustrated in Fig. 1.

Fig. 3 is a sectional view of another modified form of construction.

Fig. 4 is a detail sectional view of the second modified form taken substantially on the plane of the line 4—4 in Fig. 3.

In order that the signal indicator device may be utilized in connection with standard gasoline dispensing equipment of conventional design and proven merit, and to avoid any necessity of special tooling or the construction of any complicated type of apparatus, the signal indicator device is designed and constructed so that it may be applied to a conventional dispensing nozzle, either permanently or temporarily, and without requiring any substantial changes in design of the nozzle structure. In the present invention, the signaling devices are provided in a separate nozzle conversion unit so arranged and constructed that it may be instantly applied to any of the standard forms of nozzles now adapted for use in the army, and when so attached will convert the standard type of dispensing nozzle into an audible signal indicating nozzle whereby the operator will be warned that the liquid level in the vessel being filled has reached a predetermined level so that he may manually shut off the fuel flow in time to prevent overflow.

In the drawing, the numeral 11 indicates a gasoline dispensing valve body which is provided with a spout 12 secured to the body 11 by the threaded nut 13. The valve body 11 also includes a valve seat arranged to separate the inlet passageway from the discharge passageway. The valve seat is normally closed by a valve at the upper end of the valve stem 18 and normally urged downwardly into engagement with the valve seat by a compression spring in the conventional manner.

An operating handle 22 and link 23 are pivotally mounted at the forward end of the handle guard 24 so that the operator may grasp the handle 22 to force the valve stem 18 inwardly and lift the valve from the seat to permit the liquid to flow through the discharge passageway and outwardly through the lower end of the spout 12.

The structures thus far described are entirely conventional and well-known in the art, and since they do not form a pertinent part of this invention except in connection with the structure to be hereinafter described, they will not be mentioned in greater detail in this application.

The audible signal conversion unit consists of a stopper body 26 drilled with a large cylindrical opening 26' through which the spout 12 of the nozzle extends. A set screw 26'' is threaded into the stopper body, to secure the stopper in position on the spout, the stopper body 26 is preferably formed of metal and is arranged to include an annular flange 27 and a neck portion 28 terminating in a small lip 29 arranged to maintain a resilient gasket 30 in position on the neck. The resilient gasket 30 is preferably provided with an angularly inclined sealing surface of size and shape to firmly engage the inner walls of the mouth of a sheet metal fuel container 31. As illustrated, the container 31 constitutes a standardized type of five-gallon fuel container from which Army vehicles are customarily refueled in the field.

In this construction the stopper body 26 is drilled with a bore 32 parallel to and closely adjacent the bore 26' through which the spout 12 of the nozzle extends. A whistle tube 34, which is preferably a rather thick-walled brass tube, is pressed into position to extend downwardly from the stopper body and parallel with the spout of the nozzle. If desired, the lower end of the whistle tube 34 may be plugged with a brass plug 35 which should, however, have a vent 36 therein. The entire tube and plug structure is beveled at a 45 degree angle to facilitate entrance of the signaling structure into the mouth of the container.

The thick-walled tube structure is not readily subject to damage and need not necessarily be supported at the lower end, but if desired it may be welded to the spout 12 of the nozzle. A side inlet port 37 is provided in the wall of the tube 34 immediately below the stopper body to permit the entry of air from the side of the tube to the tube's interior. This port 37 may be formed either by drilling one or more holes in the tube wall or by milling a transverse slot. A whistle lip portion 38 is provided on the inside of the tube adjacent the side inlet port 37 and has been illustrated as a metallic plug of triangular cross-section extending partially across the inside diameter of the tube, although the shape of the plug may be varied somewhat, without departing from the spirit of the invention. The lip portion 38 divides the tube 34 into a lower whistle section 39 in which a column of air may be trapped to cause operation of the whistle, and an upper portion 41, which is open to the atmosphere.

In operation, the operator will position the resilient gasket of the stopper body 26 against the mouth of the container being filled to substantially seal the container and cause the air emitted from the interior of the container to pass through the side port 37 and the lower vent 36 of the whistle and thence outwardly to the upper portion 41 of the tube 34. As long as a stream of air enters the vent passageway 36, the air within the lower chamber 39 of the tube 34 will not be trapped and the whistle will not be operative. When the liquid level reaches the port 36, however, the flow of air through that port will be interrupted, with the result that the jet of air passing through the side port 37 will impinge the lip 38 and, since the whistle chamber 39 is closed at its lower end, the whistle will emit a warning signal so that the operator may manually close the nozzle valve.

In the form of the invention illustrated in Fig. 2, the mode of operation is identical to that just described. In this construction, however, the stopper body is provided with a solid brass rod 51 drilled with a relatively large upper bore 52 open to the atmosphere and a bore 53 open at the lower end of the tube. The size and relative locations of the bores 52 and 53 are such that the tapered forward ends of the drills with which each are formed will cooperate to leave a whistling lip 54 at the point of intersection between the upper and lower bores. A side inlet port 56 is then drilled in such a position that the jet of air projected through the port will impinge the lip 55 and cause the whistle to operate whenever the lower end of the lower bore 53 is closed by the rising level of liquid. The lower extremity of this bore 53 has been illustrated as completely open to the interior of the container but it will be understood, of course, that if desired it may be provided with a vented plug similar to the plug 35 illustrated in connection with the device shown in Fig. 1.

In the modified form of the invention illustrated in Figs. 3 and 4 the stopper body is drilled to receive a downwardly extending brass rod 61 and the rod 61 is provided with a lower drilled opening 62 and an upper drilled opening 63 open to the atmosphere. The drilled passageways 62 and 63 are so related to each other as to intersect immediately below the lower surface of the stopper body, so that a whistling lip 64 is formed at their point of intersection. Side passage ports 65 and 66 are then drilled in from the outside of the tube and so located as to project a jet of air against the whistling lip 64.

The operation of this modified form of the invention is similar to that described in connection with Figs. 1 and 2, since as long as the lower end of the passageway 62 is open to the air within the container the flow of air through the passageway 62 and into the passageway 63 will prevent the operation of the whistle. When the lower end of the passage 62 is closed by the rising level of the liquid, however, the air entering the side ports 65 and 66 will impinge the whistling lip 64 and emit a signal so that the operator may manually close the valve of the dispensing nozzle.

From the foregoing it will be apparent that by practicing the teachings of the present invention it is possible to provide a highly satisfactory signal indicating nozzle of extremely simple construction capable of entirely satisfactory operation even under the most adverse circumstances of use. It will be noted, of course, that the entire nozzle structure may be of conventional design and construction and the indicating features included by the simple addition of a few comparatively inexpensive parts. In military operations, the indicator here disclosed is of particularly desirable construction since it has no moving parts whatsoever and can be subjected to great abuse without damage. In this connection, it will be noted that the entire stopper body and particularly the whistle structure is quite well protected against accidental damage, since it lies closely adjacent the threaded nut 13 of the nozzle and is close to the nozzle handle guard 24 so that a line drawn between the lower extremity of the nozzle 12 and the guard 24 will not intercept any portion of the stopper body construction. This, of course, means that the stopper is not apt to be damaged by being dropped on the ground or even against steel or concrete surfaces, since the force of any accidental impact will be more apt to be delivered to the nozzle 12 or the guard 24.

Further, the conventional type of nozzle may be altered to provide a warning signal without making any changes in its inherent design. It will also be appreciated that the signal is entirely positive in operation, since the medium by which it is operated is the air entrapped within a closed container and this flow may be depended upon since it is utterly impossible to fill the container with liquid without causing the corresponding discharge of air, so that the operation of the signal device is entirely independent of the pressure at which the fuel is admitted to the nozzle. The rate of flow of the fuel may also vary within wide limits without affecting the efficiency of the device, since with the whistle constructed as illustrated in the drawing a comparatively small rate of flow will emit a distinctly audible signal and the flow may be greatly increased without materially affecting the operation of the device except to intensify the whistling sound.

I have shown and described the present invention in the preferred form as developed for military purposes. I am, however, aware that it is subject to numerous alterations and modifications without departing from the spirit of the invention and I therefore do not wish to be limited except as by the scope of the appended claims.

Having thus described my invention, what is claimed as new and desired to secure by Letters Patent is:

1. In a signaling device to indicate the liquid level within a container, a whistle including a passageway extending from the exterior of the container to the interior thereof, having its lower end in communication with the interior of the container and its upper end open to the atmosphere; a single whistling lip positioned within the passageway at a point at one side of the passageway only, and intermediate of the ends of passageway, substantially below the upper end of the passage, substantially above the lower end of said passage; a plug portion partially closing the lower end of said passage, said plug being provided with a vent substantially below the top of the container whereby air may be admitted at the lower end of the passageway, and a side air inlet constituting an opening in the passage wall remote from and above the vent, adjacent the whistling lip and below the top of the container, whereby air may be admitted from the interior of the container; said inlet being in exact alignment with the edge of the lip so that air entering said inlet will form a jet directed to impinge the edge of said lip the arrangement being such that as the container is filled air trapped therein will be simultaneously and inaudibly vented through the lower end of the passageway and through the side whistling inlet, and so that the lower end of the passageway may be closed by the rising level of liquid within the container to cause air to be vented through the side port only, to impinge the whistling lip and emit an audible signal.

2. In a signaling device to indicate the liquid level within a container, a whistle including a passageway extending from the exterior of the container to the interior thereof, having its lower end in communication with the interior of the container and its upper end open to the atmosphere; a single whistling lip positioned within the passageway at a point at one side of the passageway only, and intermediate of the ends of the passage, substantially below the upper end of said passage and substantially above the lower end of said passage, a vent substantially below the top of the container whereby air may be admitted at the lower end of the passageway, and a side air inlet constituting an opening in the passage wall remote from and above the vent, adjacent the whistling lip and below the top of the container, said inlet being in exact alignment with the edge of the lip so that air entering said inlet will form a jet directed to impinge the edge of said lip whereby air may be admitted from the interior of the container, the arrangement being such that as the container is filled air trapped therein will be simultaneously and inaudibly vented through the lower end of the passageway and through the side whistling inlet, and so that the lower end of the passageway may be closed by the rising level of liquid within the container to cause air to be vented through the side port only, to impinge the whistling lip and emit an audible signal.

3. In a signaling device to indicate the liquid level within a container, a whistle including a passageway extending from the exterior of the container to the interior thereof, having its lower end in communication with the interior of the container and its upper end open to the atmosphere, a single whistling lip at one side of the passageway only and associated with the passageway, a vent substantially below the top of the container whereby air may be admitted at the lower end of the passageway, and an air inlet constituting an opening in the passage wall remote from and above the vent, and below the top of the container, whereby air may be admitted from the interior of the container; said inlet being in exact alignment with the edge of the lip so that air entering said inlet will form a jet directed to impinge the edge of said lip the arrangement being such that as the container is filled air trapped therein will be simultaneously vented through the lower end of the passageway and through the air inlet, and so that the vent may be closed by the rising level of liquid within the container to cause air to be passed through the air inlet only, to emit an audible signal.

4. In a signaling device, a whistle structure including a cylindrical tube extending downwardly into a container and having its lower end in communication with the interior of the container and its upper end open to the atmosphere, a single whistling lip positioned within the tube at a point at one side of the passageway only, and substantially below the upper end of said tube and substantially above the lower end of said tube, said tube being arranged whereby air may be admitted at the lower end of the tube as the container is being filled, and so that the lower end of the tube will be closed by the rising level of the liquid within the container, and a side air inlet constituting an opening in the tube wall adjacent the whistling lip whereby air may be admitted from the interior of the container, said inlet being in exact alignment with the edge of the lip so that air entering said inlet will form a jet directed to impinge the edge of said lip the arrangement being such that when the container is being filled air trapped therein will be simultaneously admitted through the lower end of the tube and through the side whistling inlet so that the air will be inaudibly vented until the level of liquid within the container rises above and closes the lower end of the tube whereupon an audible signal will be produced.

5. In a signaling device, a whistle structure including a cylindrical tube, a single whistling lip positioned within the tube at a point at one side of the passageway only, and substantially spaced apart from the opposite ends of said tube, a tube plug portion partially closing the one end of the whistle tube, said plug being provided with a vent whereby air may be admitted to the tube, and a side air inlet constituting an opening in the tube wall adjacent the whistling lip whereby air may be admitted to the tube, said inlet being in exact alignment with the edge of the lip so that air entering said inlet will form a jet directed to impinge the edge of said lip the arrangement being such that air may be simultaneously admitted through the vent and through the side air inlet permitting air to flow over whistling lip without causing sound to be emitted from the whistle, and through the side air inlet to permit passage of air without causing sound to be emitted from the whistle, or so that the air may be admitted through the side port only to emit an audible signal.

6. In a signaling device, a whistle structure including a cylindrical tube having a passageway therethrough, a single whistling lip positioned within the tube at one side of the passageway only, and substantially spaced apart from either end of said tube, and a side air inlet constituting an opening in the tube wall adjacent the whistling lip whereby air may be admitted from the interior of a container being filled, said inlet being in exact alignment with the edge of the lip so that air entering the said inlet will form a jet directed to impinge on the edge of said lip, the arrangement being such that when the container is being filled, air trapped therein may be simultaneously admitted through the lower end of the tube and through the side whistling inlet so that air may be inaudibly vented, or air may be admitted through the side air inlet only, to cause an audible signal to be sounded.

LOWELL F. HAMMAND.